United States Patent [19]

Hata

[11] Patent Number: 5,274,223
[45] Date of Patent: Dec. 28, 1993

[54] VARI-FOCAL LENS CONTROL SYSTEM WITH LENS DRIVING AND MAGNIFICATION LENS DRIVING MEANS

[75] Inventor: Daisuke Hata, Funabashi, Japan

[73] Assignee: Ricoh Company, Ltd., Tokyo, Japan

[21] Appl. No.: 948,582

[22] Filed: Sep. 23, 1992

[30] Foreign Application Priority Data

Sep. 26, 1991 [JP] Japan .................................. 3-273547

[51] Int. Cl.$^5$ .............................................. G01J 1/20
[52] U.S. Cl. .................................. 250/201.2; 354/402
[58] Field of Search ...................... 250/201.2, 201.3; 354/400, 402

[56] References Cited

U.S. PATENT DOCUMENTS

| | | | |
|---|---|---|---|
| 4,881,799 | 11/1989 | Ohno et al. | 354/408 |
| 4,899,190 | 2/1990 | Hata | 354/400 |
| 5,053,800 | 10/1991 | Ishida et al. | 250/201.2 |
| 5,053,801 | 10/1991 | Ishida et al. | 250/201.2 |

FOREIGN PATENT DOCUMENTS 62-231207 10/1987 Japan .
62-258413 11/1987 Japan .
63-88534 4/1988 Japan .

*Primary Examiner*—David C. Nelms
*Assistant Examiner*—T. Davenport
*Attorney, Agent, or Firm*—Oblon, Spivak, McClelland, Maier & Neustadt

[57] ABSTRACT

A control system for vari-focal lens can keep a vari-focal lens in focus during magnification change, and can conduct quick focusing even if a distance measurement is not possible in a phase difference detection method. A focusing correction calculation circuit calculates two data, one of which is a focusing lens position datum obtained by a focusing lens position detection device and the other of which is a magnification changing lens group position datum obtained by a magnification changing lens position detection device, to obtain a correction amount datum and a correction focusing direction datum. Another calculation circuit obtains a phase difference datum based on a phase difference detection datum detected by a phase difference detector. If a judgement circuit judges either that the distance measurement is not possible, that the phase difference is under calculation, or that the phase difference is under detection, a focusing correction is effected based on the correction amount datum and the correction focusing direction datum. If the judgement circuit judges otherwise, the focusing is effected based on the datum obtained from the phase difference detection datum.

19 Claims, 11 Drawing Sheets

| Fig.1 (a) | Fig.1 (b) | Fig.1 (c) |

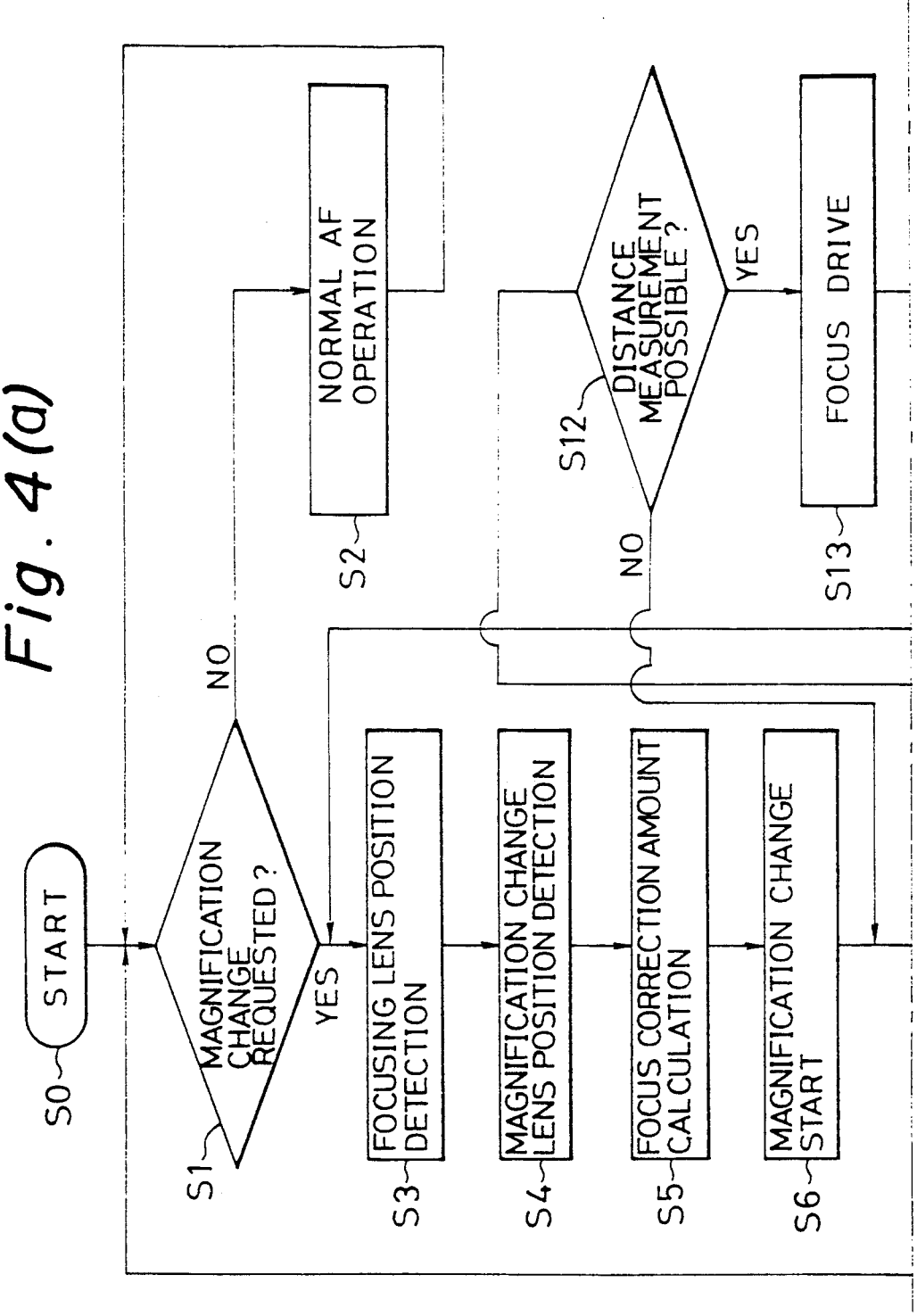

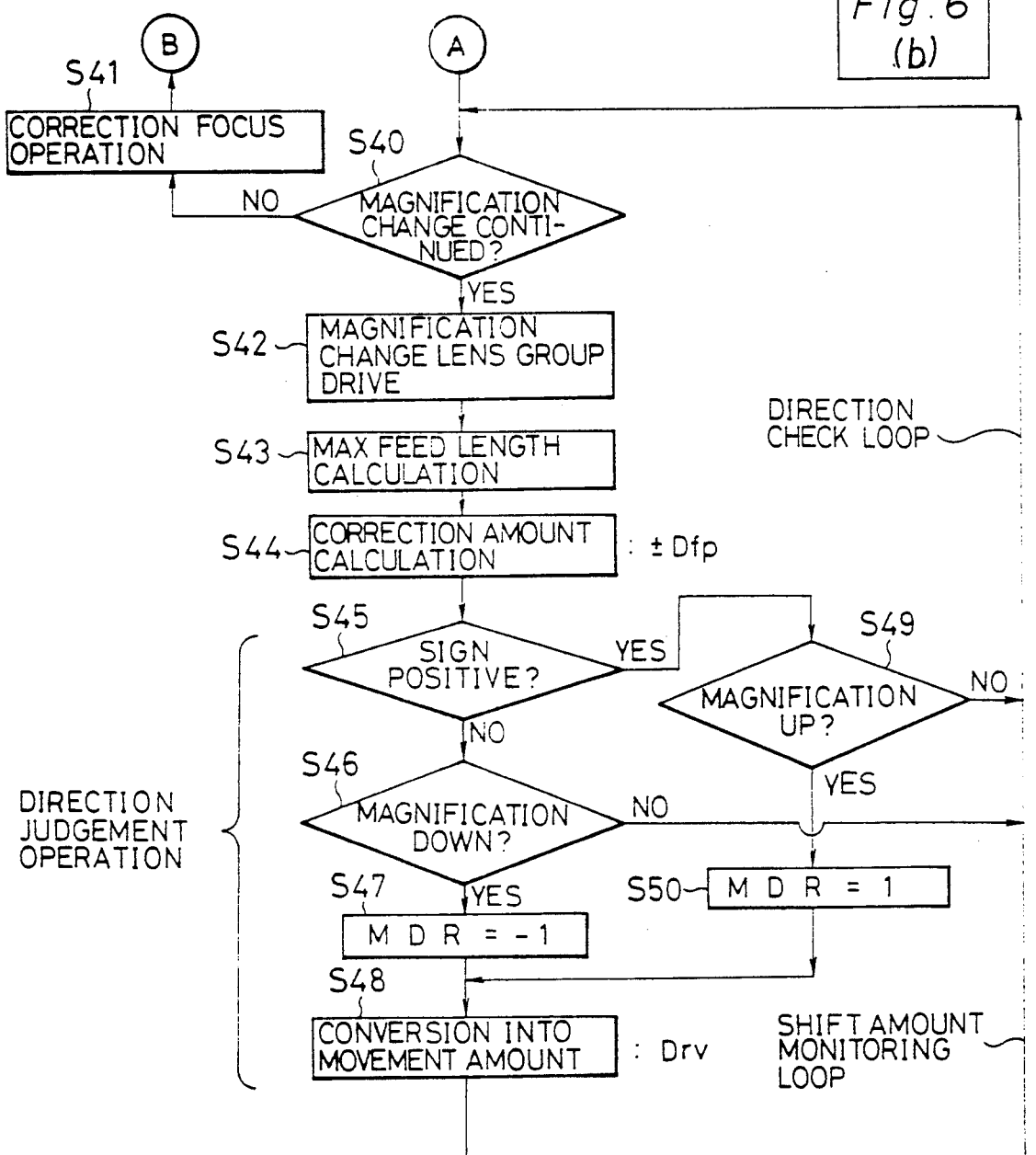

VARI-FOCAL LENS CONTROL SYSTEM WITH LENS DRIVING AND MAGNIFICATION LENS DRIVING MEANS

BACKGROUND OF THE INVENTION

1. Field of the Invention

The present invention relates to a vari-focal lens control system. More particularly, the invention relates to a system for controlling a vari-focal lens having a magnification change photographic optical system comprising a magnification changing lens group and a focusing lens group disposed on a single optical axis, which may have an imaging offset with a single subject after the focusing lens group is set at a focusing point between the closest and the infinity positions on the optical axis corresponding to a subject distance ranging from the closest to the infinity distance and when an overall system focal length of the magnification change photographic optical system is renewed by the magnification changing lens group from an arbitrary first focal length to a second focal length between the shortest focal length and the longest focal length.

2. Description of the Related Art

A focusing (operation to make an image in focus) is usually effected in a zoom lens by moving a focusing lens group provided in a magnification change optical system. Such a zoom lens has an advantage that a distance of movement of the focusing lens group is fixed for the same subject distance in an entire zoom range. This is referred to as an "equivalent movement". Accordingly, a scale of subject distance is attached to a moving member (distance ring) of the focusing lens group, and an index to a fixed ring disposed adjacent to the distance ring, without a need to change a scale of subject distance during zooming.

However, although a situation differs depending upon a lens arrangement of the magnification change optical system, the lens arrangement is likely to become complicated with an optical design under a condition that the above equivalent movement can be effected in a zoom lens of inner focusing method or of rear focusing method. There is another problem in such a zoom lens that a distance of movement (feed length) of the focusing lens group becomes unnecessarily greater on the wide angle side.

Further, that results in increase in outer diameter of lens, increasing the weights of lens and lens barrel.

There is a vari-focal lens already proposed without a condition of the equivalent movement to solve the above problems. Nonetheless, the vari-focal lens has a problem of imaging offset during a magnification change operation, which corresponds to a zooming operation in the above zoom lens.

It is considered to solve this problem that a part of magnification change optical system constituting the vari-focal lens is arranged to be a focusing lens group for focusing drive independent of the magnification change operation, that an imaging offset, which will also be referred to as a shift, during the magnification change operation is calculated by calculation, and that a position of the focusing lens group is corrected based on the calculation result. Such an arrangement permits an operability substantially equivalent to that of the zoom lens.

For the automatic shift correction, a control system is for example constituted by a magnification change drive unit for driving the magnification change optical system by a magnification change motor or the like to set an arbitrary focal length, a focusing drive unit for driving the focusing lens group by a focus motor or the like, a focal length detector such as a potentiometer for detecting a presently set focal length as an analog quantity such as a voltage, and a focus position detector such as a potentiometer for detecting a current position of the focusing lens group as an analog quantity such as a voltage.

In the above vari-focal lens, a focusing position of the focusing lens group changes depending upon a focal length with an identical subject. A locus of the change is a hyperbola with a variable of focal length (an output of the focal length detector). Suppose the focusing lens group is in focus and the magnification is changed from this state. The control system of the vari-focal lens keeps the in-focus state by moving the focusing lens group along the hyperbola, such that a focal length to be set may be reached to by alternately repeating a focusing operation (as will be hereinafter referred to as a shift correction operation) and a magnification change operation changing the focal length in order to naturally correct a change in view angle in a finder.

A next feed length and drive direction of the focusing lens group to an in-focus position are calculated for each shift correction operation as alternately repeated.

It is desirable that a still camera of single lens reflex type or a video camera using such a vari-focal lens always keeps the in-focus state during the magnification change. Because a still camera can execute a photographing efficient and compatible to a photographic intention by keeping a screen observed in focus during magnification change. Also, a video camera is naturally required to have no focus deviation during photographing with a magnification change.

There are two major concrete techniques for keeping in-focus condition during magnification change.

Japanese Unexamined Patent Publication No. 68-88534 describes the first technique, in which a subject distance is detected immediately before a start of magnification change, and a position of a focusing lens group or an image pickup device forming a magnification change photographic optical system is controlled in drive by an operational circuit such that the subject distance detected is kept unchanged during magnification change.

Japanese Unexamined Patent Publication No. 62-231207 describes the second technique, in which a magnification change position datum is obtained by detecting a position of a magnification changing lens group or a member moving with the magnification change operation, forming a magnification change photographic optical system which has once been brought into an in-focus state by known means, and in which a focusing position datum is obtained by detecting a position of a focusing lens group or a member moving with the focusing operation while driving the focusing lens group forming the photographic optical system in correspondence to a subject distance.

Then the focusing lens group is controlled in drive to always keep the in-focus state even during magnification change for an arbitrary subject distance based on the two data, that is, the magnification change position datum and the focusing position datum.

In the first technique as described above, a well-known phase difference detection method using a CCD is commonly used as means for detecting the in-focus state immediately before the start of magnification change in the magnification change photographic optical system.

From another point of view, there are two methods to effect focusing correction during magnification change in a vari-focal lens.

The first method is that focusing detection is always conducted by known focusing state detection means using a CCD during magnification change and that a focusing lens group forming a photographic optical system is driven for focusing based on a result of focusing detection.

The second method is that an in-focus state is first achieved with use of known in-focus state detection means using a CCD immediately before starting magnification change, that both positions of focusing lens group and of magnification changing lens group forming a magnification change photographic optical system are detected during magnification change, and that the focusing lens group is driven to a position to be set based on the positional relation between them.

If a conventional vari-focal lens control apparatus employs the above first method for focusing correction during magnification change, the focusing correction could be nullified in case of inability of distance measurement due to a condition of subject, for example, due to a flat brightness distribution or to a specific shape of subject.

If a conventional vari-focal lens control apparatus employs the second method, and if a subject moves during magnification change to change a subject distance, the system becomes out of focus at the point of subject movement.

Comparing a responsivity to focusing correction during magnification change in the vari-focal lens control apparatus employing the first method with that in the control apparatus employing the second method, the first method requires a more time than the second method, because a charge storage time is necessary for the CCD conducting the focusing detection during magnification change. If a brightness of subject is extremely low a charge storage time for CCD becomes longer, greatly decreasing the responsivity.

SUMMARY OF THE INVENTION

It is an object of the present invention to provide a solution to the above-mentioned various problems, and to provide a vari-focal lens control system which can keep an in-focus state during magnification change drive of a vari-focal lens and which can perform high speed focusing correction in a broad range during magnification change even in inability of distance measurement by focusing drive based on a subject distance measured immediately before the moment of distance measurement inability.

The object of the present invention can be achieved by a control apparatus for vari-focal lens comprising a magnification changing lens group and a focusing lens group coaxially disposed, comprising: magnification change drive means for driving the magnification changing lens group; magnification changing lens position detection means for detecting a position of the magnification changing lens group on an optical axis; focusing drive means for driving the focusing lens group; focusing lens position detection means for detecting a position of the focusing lens group on the optical axis; focusing correction calculation means for calculating a correction amount of position of the focusing lens group to a given magnification change with reference to a predetermined relation between the magnification changing lens group position and the focusing lens group position; focusing detection means for receiving an optical flux through the vari-focal lens to obtain a focusing detection datum about focusing; judgement and process means for performing a judgement about the focusing detection datum and for performing a process of the focusing detection datum; and control means for controlling drives of the magnification change drive means and of the focusing drive means by the given magnification change, the correction amount calculated, and the focusing detection datum with reference to the judgement and process of the judgement and process means.

The judgement of the judgement and process means may be about whether the distance measurement is possible based on the focusing detection datum, about whether the focusing detection datum is under detection, or about whether the focusing detection datum is under process.

The process of the judgement and the process means may be a process for calculating a focus deviation amount from the focusing detection datum.

The correction amount calculated by the focusing correction calculation means may be an amount and a direction of correction by which the focusing lens group is to be moved.

The predetermined relation for obtaining the correction amount is as follows:

$$Dfp = \{Cfp \times Fp(e)/256\} - S(i),$$

where Dfp is the correction amount, S (n) a focusing lens position with respect to the infinity for a given focal length point n on the optical axis, Fp (n) a maximum focusing lens position with respect to the infinity on the optical axis for n, $Cfp = S(i)/Fp(i)$, i an initial point, and e an end point.

In the above relation, Fp (e) may be calculated as follows:

$$Fp(e) = \{C2/Zp + C1\} + C3,$$

where C1, C2, C3 are constants, which include a parameter of subject distance, and Zp is a datum about a focal length.

In the above control apparatus, where the distance measurement is not possible, the control means controls the focusing drive means to drive the focusing lens group based on the correction amount calculated, while, where the distance measurement is possible, the control means controls the focusing drive means to drive the focusing lens group based on the focusing detection datum.

Further, where the focusing detection datum is under detection, the control means control the focusing drive means to drive the focusing lens group based on the correction amount calculated, while, where the focusing detection datum has been detected, the control means controls the focusing drive means to drive the focusing lens group based on the focusing detection datum.

Also, where the focusing detection datum is under process, the control means controls the focusing drive means to drive the focusing lens group based on the correction amount calculated, while, where the focusing detection datam has been processed, the control means controls the focusing drive means to drive the focusing lens group based on the focusing detection datum processed.

In the above control apparatus, the control means makes the focusing drive means drive the focusing lens group only if the correction amount has the direction of correction correspondent to a predetermined direction.

Also, the control means makes the focusing drive means drive the focusing lens group only if the correction amount exceeds a predetermined amount.

Further, the drive of the focusing drive means based on the correction amount is monitored by a slit disk and a focus counter.

The present invention may be applied to a camera with a vari-focal lens.

The camera comprises the above-described control apparatus a vari-focal lens comprising a magnification changing lens group and a focusing lens group; image recording means for recording an image obtained through the vari-focal lens; and magnification change setting means for setting a magnification change amount.

The object of the present invention can also be achieved by a control method for vari-focal lens comprising a magnification changing lens group and a focusing lens group coaxially disposed, comprising: a magnification changing lens position detection step for detecting a position of the magnification changing lens group on an optical axis; a focusing lens position detection step for detecting a position of the focusing lens group on the optical axis; a focusing correction calculation step for calculating a correction amount of position of the focusing lens group to a given magnification change with reference to a predetermined relation between the magnification changing lens group position and the focusing lens group position; a focusing detection step for receiving an optical flux through the vari-focal lens to obtain a focusing detection datum about focusing; a judgement and process step for performing a judgement about the focusing detection datum and for performing a process of the focusing detection datum; and a control step for controlling drives of the magnification changing lens group and of the focusing lens group by the given magnification change, the correction amount calculated, and the focusing detection datum with reference to the judgement and process in the judgement and process step.

In the vari-vocal lens control apparatus according to the present invention, the focusing correction calculation means calculates the correction amount based on the two data, that is, the magnification changing lens position datum detected by the magnification changing lens position detection means when the magnification change drive means drives the magnification changing lens group for magnification change and the focusing lens position datum detected by the focusing lens position detection means when the focusing drive means drives the focusing lens group for focusing.

The judgement and process means judges whether the distance measurement is possible. If the judgement and process means judges that the distance measurement is possible, the focusing drive means drives the focusing lens group for focusing based on the focusing detection datum obtained by the focusing detection means.

If the judgement and process means judges that the distance measurement is not possible, the focusing drive means drives the focusing lens group for focusing based on a previous datum during the magnification change or on a correction amount obtained immediately before the start of magnification change.

The judgement and process means judges that the distance measurement is impossible in case that the focusing detection means is on the way of detection or in case that the judgement and process means is on the way of process.

Accordingly, the focusing lens group is driven into an accurate in-focus state based on the datum obtained by the focusing detection means when the distance measurement is possible by the focusing detection means, while the focusing lens group is driven into a state close to an in-focus point based on the datum obtained by the focusing correction calculation means when the distance measurement is not possible.

The control apparatus for vari-focal lens may correct the imaging offset intrinsic to the vari-focal lens upon renewal of overall system focal length. If a reliability of phase difference detection datum obtained by the focusing detection means is doubtful, if the phase difference datum is under detection, or of the phase difference datum is under calculation, the control means controls the focusing drive means to drive the focusing lens group based on the correction amount which has already been obtained by the focusing correction calculation means, which permits quick and accurate focusing as well as a finder observation equivalent to a conventional zoom lens.

If a low brightness of subject does not allow a distance measurement in the phase difference detection method, the focusing correction calculation is carried out based on a distance datum of subject immediately before the moment of inability of distance measurement. Since the focusing drive is carried out with the focusing correction datum thus calculated, a high speed focusing correction may be conducted in a broad range during the magnification change. Therefore, the present invention may provide a vari-focal lens control apparatus effective for use in a video camera.

Further objects and advantages of the present invention will be apparent from the following description of the preferred embodiment of the invention as illustrated in the accompanying drawings.

DESCRIPTION OF THE PREFERRED EMBODIMENT

Figure 1A:
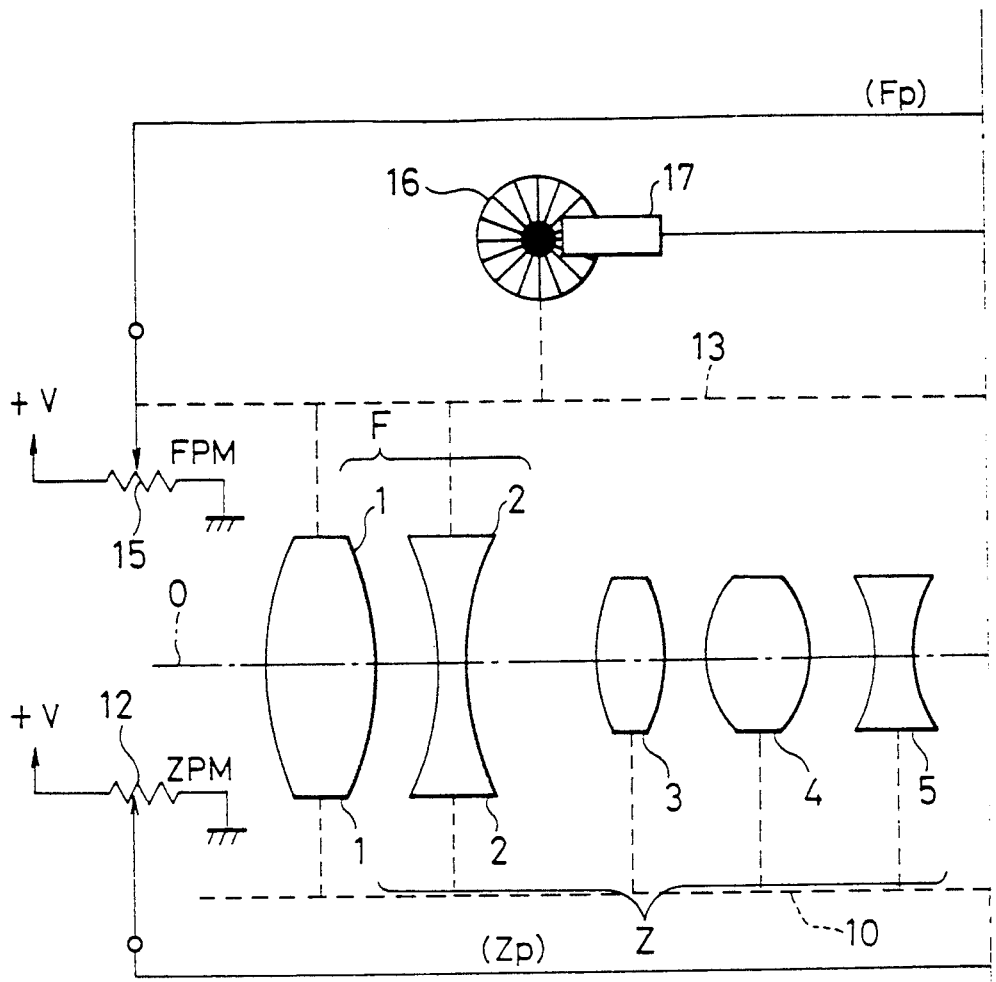
FIG. 1*i*-1*iii* are block diagrams to show an overall arrangement of an embodiment of vari-focal lens control apparatus according to the present invention.
Figure 1A:
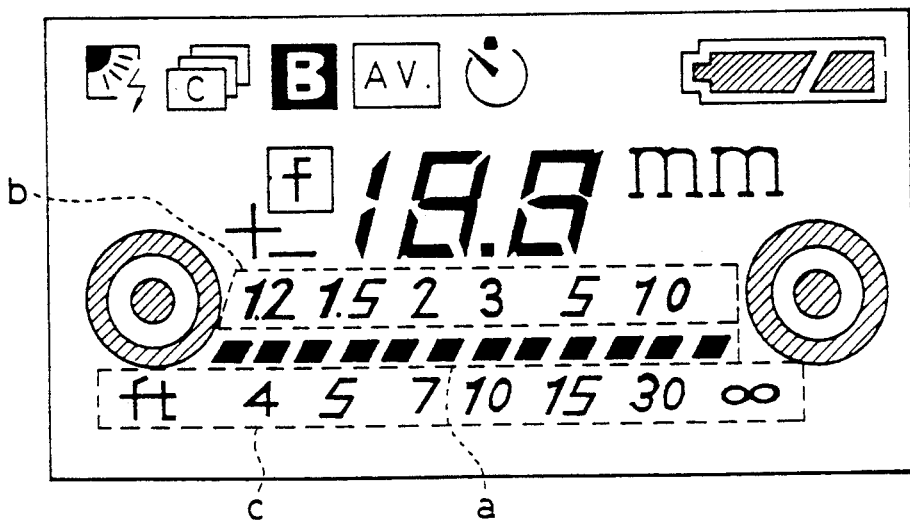
Figure 1B:
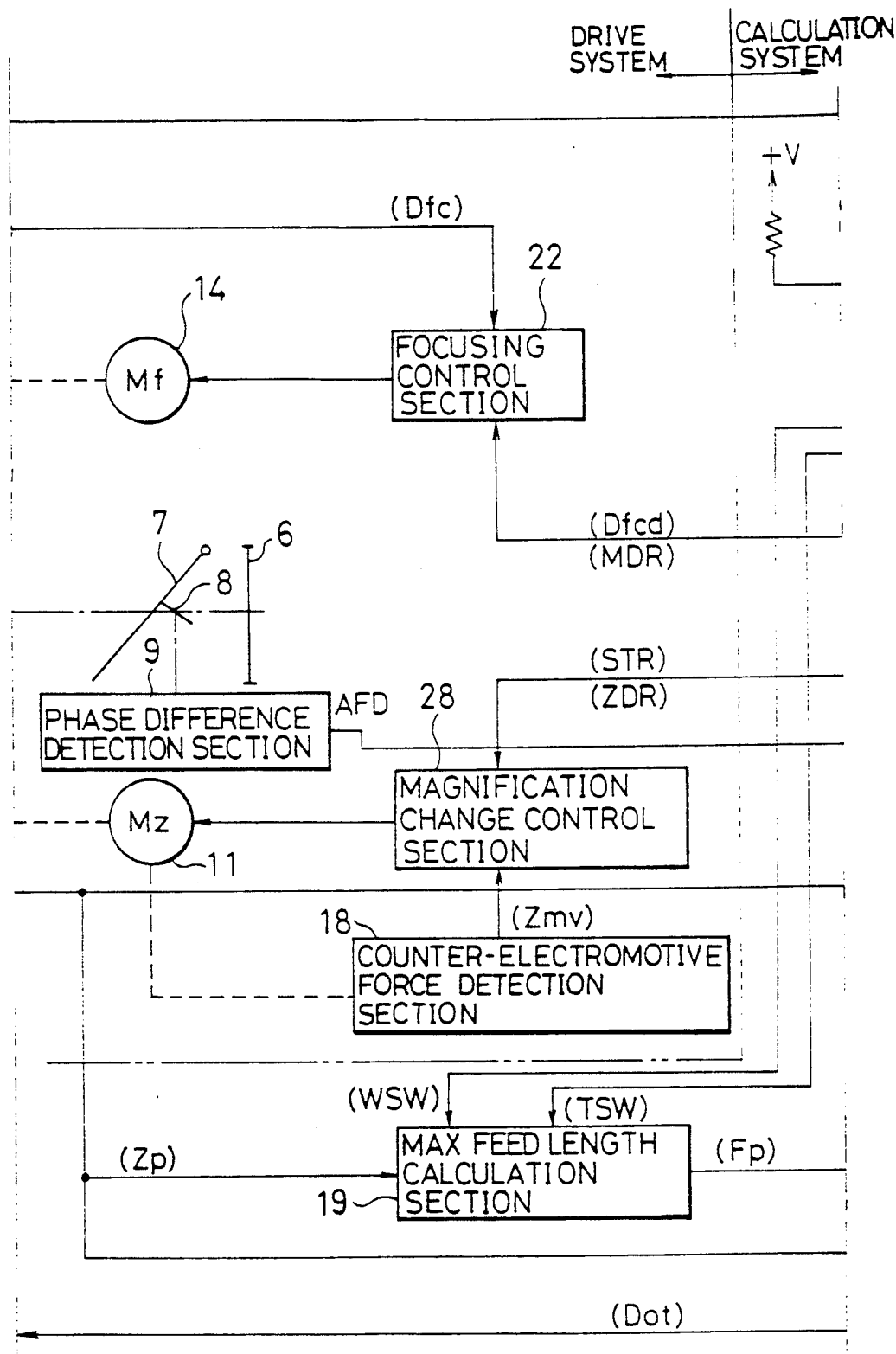
Figure 1C:
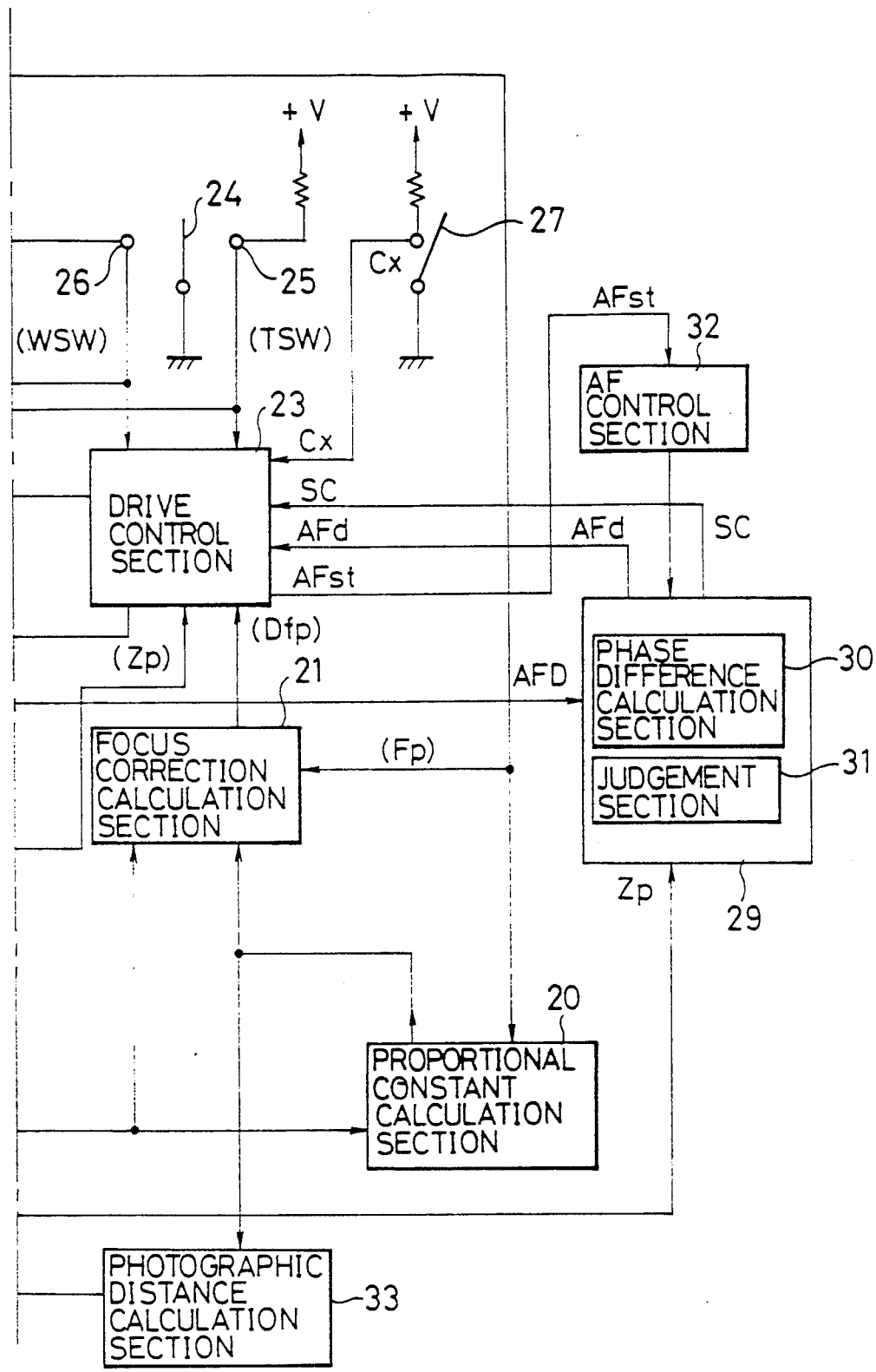

There is below explained a preferred embodiment of a vari-focal lens control apparatus according to the present invention, which is applied to a still camera of single lens reflex type, with reference to the accompanying drawings.

FIG. 1 is a block diagram to show an arrangement in the embodiment.

In FIG. 1, a magnification change photographic optical system is composed of first to fifth sets of lenses 1-5 disposed on an optical axis O. The first and the second sets of lenses 1, 2 move along the optical axis O in accordance with respective drives of focusing and of magnification change. The third to the fifth sets of lenses 3-5 move along the optical axis O together with the first and the second sets of lenses 1, 2 in accordance with the drive of magnification change.

An overall system focal length is f for magnification change photographic optical system composed of the first to the fifth sets of lenses 1-5. Each of the first to the fifth sets of lenses 1-5 is composed of a single lens or of a plurality of lenses. The first and the second sets of lenses 1, 2 constitute a focusing lens group F, and the first to the fifth sets of lenses 1-5 a magnification changing lens group Z.

A film plane 6 is located behind the fifth set of lenses 5 on the optical axis O. A known mirror 7 partly formed of a half mirror is disposed between the film plane 6 and the fifth set of lenses 5 for splitting an optical flux into an optical path for photographing and into another path for observation. A known small mirror 8 is disposed behind the central part of the mirror 7 to bend the optical flux for distance measurement downward.

A phase difference detection section 9 composed of a well known CCD is disposed below the small mirror 8. The phase difference detection section 9 receives the optical flux transmitted through the magnification change photographic optical system composed of the first to the fifth sets of lenses 1-5 to obtain a focusing detection datum.

Numeral 10 denotes magnification change drive means for driving the first to the fifth sets of lenses 1-5 to set overall system focal length f to an arbitrary focal length between a telephoto end focal length (as will be hereinafter referred to as tele side) as the longest focal length and a wide angle end focal length (as will be hereinafter referred to as wide side) as the shortest focal length. The magnification change drive means 10 consists of a magnification changing motor 11 as will be referred to as Mz and of a magnification change drive section composed of an unrepresented mechanical portion.

Magnification changing lens position detection means 12 as will be hereinafter referred to as ZPM is connected to the magnification change drive means 10 to obtain a magnification changing lens position datum Zp as will be hereinafter referred to as a focal length datum, which is obtained as a voltage proportional to the overall system focal length f, by detecting positions of the first to the fifth sets of lenses 1-5 on the optical axis O.

Numeral 13 denotes focusing drive means for driving the first and the second sets of lenses 1, 2 to respective positions for focusing between the infinity position and the closest position on the optical axis O corresponding to a subject distance ranging from the infinity to the closest. The focusing drive means 13 consists of a focus motor 14 as will be hereinafter referred to as Mf and of a focus drive section composed of an unrepresented mechanical portion.

Focusing lens position detection means 15 as will be hereinafter referred to as FPM is connected to the focusing drive means 13 to obtain a focusing lens position datum FP, which is obtained as a voltage proportional to a position of the focusing lens, by detecting respective positions of the first and the second sets of lenses 1, 2 on the optical axis O.

A slit disk 16 is connected through an unrepresented interconnecting mechanism to the focusing drive means 13. The slit disk 16 rotates in synchronism with the focusing drive of the focusing drive means 13. A focus counter 17 is disposed adjacent to the slit disk 16. The focus counter 17 comprises a photointerrupter to generate a pulse signal for each passage of slit.

A counter-electromotive force detection section 18 is connected through an unrepresented rotational connection member to the magnification change motor 11. The counter-electromotive force detection section 18 detects a counter-electromotive force generated with a rotation of the magnification change motor 11. An output Zmv of the counter-electromotive force detection section 18 is made proportional to the number of rotations of the magnification change motor 11, and is supplied to an input terminal for rotation number control of a magnification change control section as later described.

A loaded torque is not constant between the tele end and the wide end while the magnification change motor 11 drives the first to the fifth sets of lenses 1-5 for magnification change. The change in loaded torque may change a drive speed for magnification change. A role of the counter-electromotive force detection section 18 is to prevent the change of the drive speed for magnification change by a feed back control to keep the rotation of the magnification changing motor 11 constant independent of the loaded torque. Another role of the counter-electromotive force detection section 18 is to prevent a decrease in rotation of the magnification changing motor 11 with a decrease in power of a power battery.

A maximum feed length calculation section 19 receives the focal length datum Zp to execute an A/D conversion thereof. After the A/D conversion of datum Zp, the maximum feed length calculation section 19 calculates a quantity of movement or feed length Fpm of the focusing lens group F from the infinity end to the closest end at Zp.

A proportional constant calculation portion 20 receives an output Fpx of the maximum feed length calculation portion 19 and an output Fp of the FPM15 as focus position information (focusing lens position datum) to calculate a ratio thereof after A/D conversion of the output Fp and then to output a proportional constant Cfp.

A focusing correction calculation section 21 receives the three outputs Fpm, Cfp, Fp to calculate a correction amount ±Dfp including a correction focusing direction for focusing.

The maximum feed length calculation section 19, the proportional constant calculation section 20, and the focusing correction calculation section 21 as above described constitute focusing correction calculation means. Thus, a correction focusing position calculated by the focusing correction calculation means is the same in content as the correction amount ±Dfp.

A focusing control section 22 receives an output Dfc of the focus counter 17 and an output Dfcd corresponding to the correction amount Dfp of output of the focusing correction calculation portion 21 to rotate the focus motor 14 to control the focusing drive means 13, constituting focusing correction control means.

A drive control section 23 receives the focal length datum Zp, a wide signal WSW, a tele signal TSW, and a switch signal Cx as will be later described to output a starting signal STR, and also receives the correction amount Dfp to output a drive signal Dfcd corresponding thereto. The drive control section 23 also outputs an AF start signal AFst to a later-described AF control section 32.

Further, the drive control section 23 receives a focusing drive amount datum AFd output from a judgement and calculation section 29, which is defined in the claims as judgement and process means or as judgement and calculation means. Adding the focusing drive amount datum AFd, the drive control section 23 outputs the above drive signal Dfcd. In addition, the drive control section 23 receives a judgement signal SC output from the judgement and calculation section 29 to control the drive signal Dfcd.

A magnification change switch 24 is an externally operable press button switch for changing a focal length to the tele side or to the wide side. The magnification change switch 24 is connected at a magnification increase contact 25 by an operation to the tele side to produce a tele signal TSW of L level, while at a magnification decrease contact 26 by an operation to the wide side to produce a wide signal WSW of L level.

If there is no operation of magnification change, that is, if the magnification change switch 24 is in a neutral position to indicate a focal length unchanged, the tele and the wide signals TSW, WSW are kept in a H level.

A speed change switch 27 is provided to set a magnification change speed out of two speeds of high speed and of normal. A switch signal Cx turns to an L level with press of the speed change switch 27 to indicate the high speed change, while to a H level without press of the switch 27 to indicate the normal speed change.

A magnification change control section 28 receives the starting signal STR and the output Zmv of the counter-electromotive force detection section 18 to rotate the magnification change motor 11.

The above-described drive control section 23 has a function to produce a magnification change direction signal ZDR to indicate a difference in command of magnification change either to the tele side or to the wide side based on the correction amount Dfp output from the focusing correction calculation section 21, on the operation of the magnification change switch 24, and on the operation of the magnification change speed switch 27.

The drive control section 23 also has a function to produce an execution direction signal MDR to indicate a drive for focusing either to the infinity side or to the closest side as will be later described.

The magnification change direction signal ZDR is converted into a drive direction of the focusing lens group F in accordance with a predetermined relation determined from characteristics of the magnification changing lens group Z. It is monitored whether the drive direction coincides with the correction focusing direction output from the focusing correction calculation section 21, which is substantially the correction amount Dfp, but is described as ±Dfp for explanation.

The sign ± indicates the correction focusing direction. If they coincide with each other, an execution direction signal MDR is output. In addition, the correction amount Dfp is converted into a drive signal Dfcd, which is a relative quantity of movement, and the drive signal Dfcd is output when it exceeds a predetermined value.

The execution direction signal MDR indicates a drive to the closest position side with MDR=1, while a drive to the infinity position side with MDR=−1. Therefore, the correction focusing direction ±Dfp also indicates a correction focusing position on the closest side with ±Dfp, while that on the infinity side with −Dfp.

The focusing detection datum AFD obtained at the above-described phase difference detection section 9 is supplied to a phase difference calculation and judgement portion as will be hereinafter referred to as a judgement and calculation section 29. A phase difference calculation section 30 calculates a phase difference datum or focusing drive amount datum AFd. A judgement section 31 of the judgement and calculation section 29 conducts a judgement about whether a distance measurement is possible, as will be later described.

An AF control section 32 receives the AF start signal AFst produced by the drive control section 23. The AF control section 32 produces a proper control signal for obtaining a phase difference by the phase difference calculation section 30 with the focusing detection datum AFD input into the judgement and calculation section 29 based on the AF start signal AFst.

A photographing distance calculation portion 33 receives the proportional constant Cfp from the proportional constant calculation section 20 to output a display signal Dot. A display 34 displays a predetermined indication corresponding to the display signal Dot. The display 34 has an indication portion a of bar graph sectioned into twelve pieces, a numeral portion b to indicate a subject distance in a unit of meter, and a numeral portion c to indicate a subject distance in a unit of foot.

In FIG. 1, +V represents a power source. FIG. 1 shows only main signals of input and output in the respective sections.

The magnification change direction signal indicates a magnification increase direction with ZDR=1, which is a drive from the wide side to the tele side. Whereas the magnification change direction signal indicates a magnification decrease direction with ZDR=−1, which is a magnification change drive from the tele side to the wide side.

The maximum feed length calculation section 19 executes a calculation based on the following relation:

$$Fpm = \{C2/(Zp+C1)\} + C3 \tag{1}$$

where Fpm is a maximum feed length of the focusing lens group F from the infinity end to the closest end at the focal length datum Zp, and C1, C2, C3 are constants intrinsic to the lenses of the magnification changing lens group Z.

The above constants C2, C3 include a parameter of a subject distance D. The constants C2, C3 include the nearest subject distance Do accordingly.

The proportional constant calculation section 20 executes a calculation based on the following relation:

$$Cfp = \{S(i)/Fp(i)\} \times 256 \tag{2},$$

where Cfp is an output of the proportional constant calculation portion 20, S(i) focus position information Sx, and Fp(i) a maximum feed length Fpm immediately before magnification change operation.

The focusing correction calculation section 21 executes a calculation based on the following relation:

$$Dfp = \{Cfp \times Fp(e)/256\} - S(i) \quad (3),$$

where Dfp is an output of the focusing correction calculation section 21, and Fp(e) a maximum feed length Fpm at a focal length Zp where correction is to be made.

An output Zp of the ZPM 12 is set as $Zp = 255$ on the tele side, and as $Zp = 0$ on the wide side. An output Fp of the FPM 15 is set as $Fp = 0$ at the infinity end, and as $Fp = 255$ at the closest end.

Figure 2:
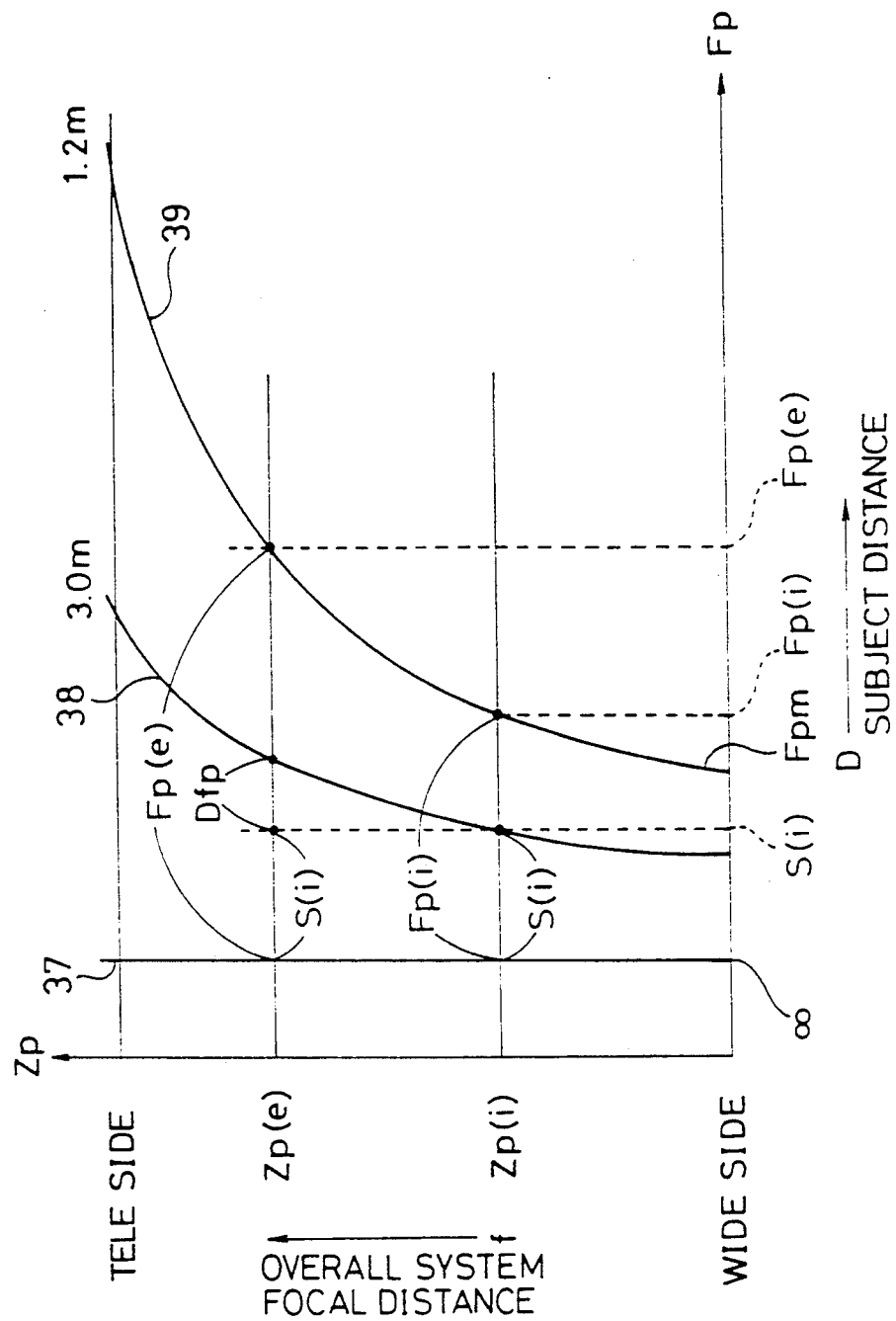
FIG. 2 is a diagram to show characteristics of the control apparatus of the present invention as shown in FIG. 1, in which a relation is given between an overall system focal length f to be set and a feed length of focusing lens group corresponding to a subject distance for each of subject distances as shown to illustrate operations of calculation sections.

FIG. 2 is a diagram to illustrate a principle of calculation in the focusing correction calculation section in the embodiment as shown in FIG. 1.

In FIG. 2, the overall system focal length f to be set is related to a feed length (movement quantity) of the focusing lens group F corresponding to a subject distance D for each of typical subject distances. The vertical axis shows the overall system focal length f, and the horizontal axis the feed length of the focusing lens group F with respect to an in-focus position at the infinity. In this embodiment, the tele end corresponds to $f = 135$ mm, and the wide end to $f = 35$ mm.

Numerals 37, 38, 39 denote focusing curves for subject distances D of the infinity, of 3.0 m, and of the closest (1.2 m, respectively). The curves may be obtained by setting the parameter of subject distance D to the infinity, to 3.0 m, or to 1.2 m in the constants C2, C3 in the above equation (1). Each curve is a hyperbola to show a change in feed length of the focusing lens group F from the infinity to the in-focus position against a change in focal length datum Zp. The focusing curve 39 is a focusing curve for the closest position, which defines the maximum feed length. The maximum feed length Fpm is a quantity of movement between the focusing curve 37 for the infinity and the focusing curve 39 for the closest.

In FIG. 2, Zp(i), S(i), and Fp(i) are a focal length datum (first focal length datum) Zp, a focusing lens position datum Fp (focus position information Sx), and a maximum movement amount (maximum feed length) Fpm between the focusing curve 37 for the infinity and the focusing curve 39 for the closest at the above Zp(i), each of data is one immediately before magnification change operation.

Further, Zp(e), Fp(e), and Dfp are a focal length datum (second focal length datum), a maximum movement amount between the focusing curves 37 and 39 at the above Zp(e), and a correction amount by which focus movement is to be corrected, each of which is one at the moment of correction after the magnification change drive section 10 starts its operation.

A ratio of feed length S(i) of the focusing lens group F up to a current position is obtained by the above equation (2) to the maximum feed length Fp(i) on $Zp = Zp(i)$ immediately before magnification change operation. After the magnification change operation, $Zp = Zp(e)$. On $Zp = Zp(e)$, S(i) is unchanged if the focusing lens group F does not move during the magnification change operation, that is, if a focusing operation is not carried out during the magnification change operation. Then, Fp(e) may be obtained by putting Zp(e) into the equation (1).

On $Zp = Zp(e)$, Dfp is an unknown number. Using the proportional constant Cfp obtained by the equation (2), the unknown number Dfp may be calculated by the equation (3). The thus-obtained number Dfp is a correction amount. The correction amount is $+Dfp$ with a sign. The correction amount Dfp is enlarged in FIG. 2 for easy understanding of explanation. If the correction amount Dfp is within a total calculation error including a conversion error due to the A/D conversion, the correction focusing direction may be opposite to that as shown.

Suppose a true correction amount is $Dfp = 2$ with the magnification changing lens group Z and the focusing lens group F being fixed, and an incorrect correction amount $Dfp = 1$ which is obtained as a calculation result. In such a case, the correction focusing direction becomes $-Dfp$ and the correction amount obtained by the calculation is an incorrect Dfp. In other words, the correction focusing direction is a random output of $+Dfp$ and $-Dfp$ in the above range of calculation error. If the focusing lens group F is directly driven by such an output, the focusing lens group F would oscillate.

Figure 3:
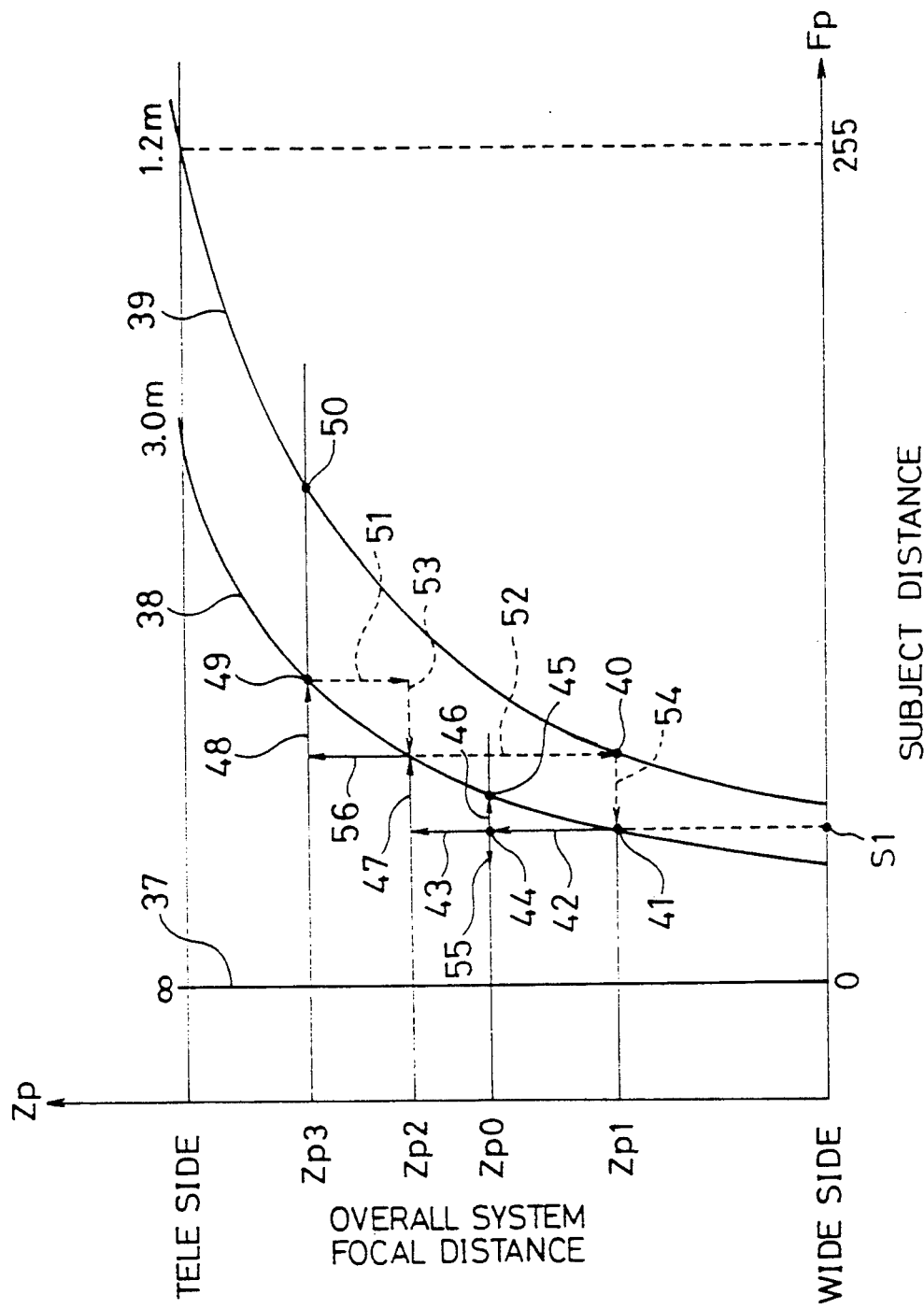
FIG. 3 is a drawing to illustrate operations of the embodiment as shown in FIG. 1.

FIG. 3 is a diagram to explain the operations in the embodiment as shown in FIG. 1, in which the same numerals are given to the same portions as in FIG. 2.

In FIG. 3, 40 and 41 are intersections of $Zp = Zp1$ with the focusing curves 38 and 39; numerals 42, 43 change amounts and directions of arrow of focal length data Zp during magnification increase operation; S1 a value of focusing lens position datum Fp at the point 41; and 44, 45 intersections of $Zp = Zp0$ with a virtual line of $Fp = S1$ and with the focusing curve 38.

Numerals 46, 47, 48 designate change amounts and changing directions of arrow of the focusing lens position data Fp during magnification increase operation; numerals 49, 50 intersections of $Zp = Zp3$ with the focusing curves 38, 39; numerals 51, 52 change amounts and changing directions of arrow of Zp during magnification decrease operation; and numerals 53, 54 change amounts and changing directions of broken arrow of the focusing lens position data Fp during magnification decrease operation. The arrows 47, 53 are parallel on the line $Zp = Zp2$. Numeral 55 represents an arrow of incorrect correction focusing direction.

FIGS. 4-7 are flowcharts to show operational steps in the embodiment as shown in FIG. 1. Details of the flowcharts will be explained with the following explanation of operations in the embodiment.

The operations of the present embodiment are explained in the following.

An unrepresented power switch of camera is turned on to supply a power to the respective sections of circuit, and a photographic operation is started in a state of predetermined initial setting. Then the flow proceeds from Step S0 to Step S1. At Step S1, the drive control section 23 judges whether a magnification change operation is requested. Specifically, the judgement is about whether the magnification change switch 24 is connected to one of the magnification increase contact 25 and the magnification decrease contact 26, or about whether it is connected to neither. That is, the judgement is about whether the contact is in the H level of the tele signal TSW or of the wide signal WSW.

If it is judged that no magnification change is requested, the flow goes to Step S2 to execute a normal AF operation. The normal AF operations is as follows. Suppose the focusing lens group F is at the closest position as an initial position. Also, the subject distance D=3.0 m.

When a distance measurement switch for starting a distance measurement operation or a release switch for starting a photographic operation as not shown becomes on, the drive control section 23 produces an AF start signal AFst to start the judgement and calculation section 29 through the AF control section 32.

Then the phase difference detection datum AFD obtained by the phase difference detection section 9 is supplied to the phase difference calculation section 30 of the judgement and calculation section 29 to calculate a subject distance. The focusing drive amount datum AFd is transmitted as a calculation result to the drive control section 23. The drive control section 23 converts the focusing drive amount datum AFd into the number of rotations of the focus motor 14, and outputs the converted rotation number as a drive signal Dfcd.

The focusing control section 22 received the drive signal Dfcd rotates the focus motor 14 while monitoring an output Dfc of the focus counter 17. The focusing control section 22 stops the focus motor 14 when Dfc=Dfcd, judging that the focusing is completed. In FIG. 3, the focusing lens group F is set on the focusing curve 38 of 3.0 m. In detail, the focusing lens group F moved from the point 40 to the point 41 in FIG. 3.

If a magnification change operation is requested at Step S1, Steps S3 to S6 are consecutively executed for detection of focus position, for detection of magnification change position, for calculation of focusing correction amount, and for start of magnification change.

Details of Steps S3–S6 are explained in the following with flowcharts of FIGS. 5 and 6.

The focusing lens group F is located to be in focus with a subject at 3.0 m as above described. Therefore, the focusing lens group F is on the focusing curve 38 in FIG. 3.

A magnification increase operation is first side. When the magnification change switch 24 is pressed towards the magnification increase contact 25 in FIG. 1, the tele signal TSW turns to the L level to start the flow of FIG. 5 from Step S30. The drive control section 23 checks a state of the magnification change switch 24 at a conditional branch of Step S31 about whether the magnification is to be increased. The flow goes into an affirmative branch in this case, because ZDR=1. If the flow goes into a negative branch, the drive control section 23 checks a state of the magnification change switch 24 at next Step S37 about whether the magnification is to be decreased. If the magnification change switch 24 is not connected to the magnification decrease contact 26, the flow goes into a negative branch to return to the above conditional branch of Step S31 checking whether the magnification is to be increased. This operation is repeated before the magnification change switch 24 is actuated. This operational loop is referred to as a switch check loop.

At next Step S32, the drive control section 23 generates a magnification change direction signal ZDR=1, because the magnification change is required to increase.

At next Step S33, the maximum feed length calculation section 19 receives an output Zp of the ZPM 12 as a focal length datum to effect an A/D conversion on the output, obtaining a converted output Zp1 in FIG. 3. At next Step S34, the proportional constant calculation section 20 receives an output Fp of the FPM 15 as a focusing lens position datum to effect an A/D conversion on the output, obtaining a converted output Fp1 (S1) in FIG. 3. The magnification changing lens group Z is located at the point 41. At Step S35, the maximum feed length calculation section 19 calculates a maximum feed length at Zp1. This calculation is put the above Zp1 into the equation (1) to obtain a maximum feed length Fpm.

The proportional constant calculation section 20 calculates the proportional constant at Step S36. The calculation is based on the equation (2) to obtain the proportional constant Cfp with the above maximum feed length Fpm. In detail, the proportional constant Cfp may be obtained by putting $S1=S(i)$ and $Fpm=Fp(i)$ at the above Zp1 into the equation (2).

In FIG. 3, a ratio is obtained of a length between the focusing curve 37 of the infinity and the point 41 on Zp=Zp1 to a length between the focusing curve 37 of the infinity and the point 40. The flow of FIG. 5 reaches A on the bottom, and continues to A of FIG. 6 on the top. The operation after the switch check loop up to A is referred to as an initial setting operation.

Figure 6B:
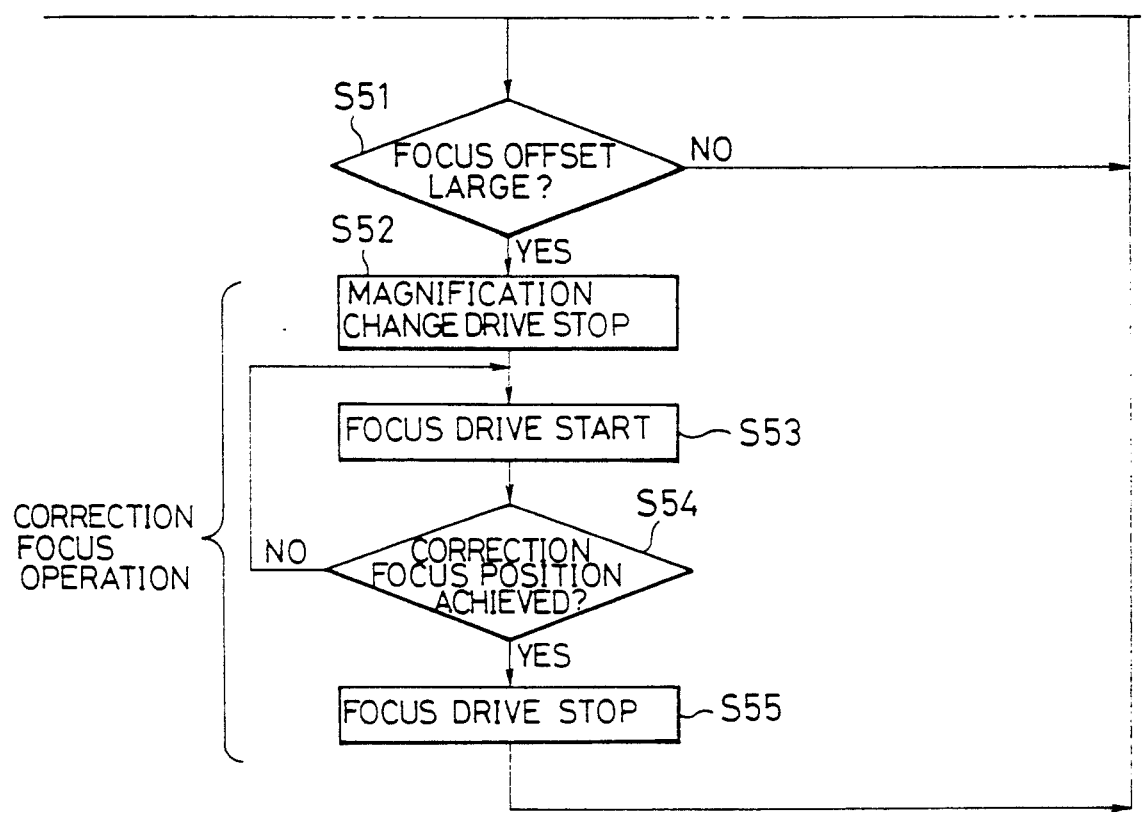
FIG. 6*i*-6*ii* are flowcharts to follow FIG. 5, further showing details of the operational steps of the embodiment as shown in FIG. 1.

At Step S40 in FIG. 6, it is judged whether the magnification change is to be continued. Specifically, the judgement is that the drive control section 23 checks whether the magnification change switch 24 is still pressed or in an ON state. Suppose the magnification change switch 24 is still pressed towards the magnification increase contact 25. Unless stated otherwise, this state is kept.

Then the flow goes into an affirmative branch at Step S40 to execute a drive of the magnification changing lens group at next Step S42. This drive is carried out through the magnification change control section 28. The magnification change control section 28 makes reference to the magnification change direction ZDR=1 to rotate the magnification change motor 11 in a direction of magnification increase. In other words, the magnification change control section 28 starts a magnification change operation.

While the magnification changing lens group Z moves, the output Zp of the ZPM 12 also changes as shown by an arrow 42 in FIG. 3. Since the focus motor 14 is not actuated, the first and the second sets of lenses 1, 2 as the focusing lens group Z are held at a constant position. Thus the output of the FPM 15 does not change during the magnification change operation.

The maximum feed length calculation is executed at next Step S43. The maximum feed length calculation section 19 reads a current value Zpo (position of point 44) of the focal length datum Zp changing in the direction of arrow 43 in FIG. 3. A current maximum feed length Fpm is calculated by putting the current focal length Zpo into the equation (1) as explained above.

A calculation of correction amount is performed at Step S44. The calculation is as follows. The focusing correction calculation section 21 again reads the focusing position datum Fp for confirmation to take a round error of the A/D converter and mechanical backlashes into consideration. A correction amount Dfp is calculated by substituting into the equation (3) the proportional constant Cfp obtained at Step S36 of proportional constant calculation in FIG. 5, $Fpm=Fp(e)$ at Zpo, and $Fp=S1=S(i)$ reread.

A direction judgement operation is explained in the following. Step S45 judges whether the sign of correction amount is positive, to judge whether the focusing direction is to the closest side or to the infinity side. Before explaining a detail of Step S45, a predetermined relation is explained, which rises from the characteristics of vari-focal lens or magnification changing lens group Z. As seen from FIGS. 2 and 3, especially from the focusing curves 38, 39, the correction focusing direction to reach either focusing curve 38 or 39 is always a drive direction of MDR=1 to the closest side in case of magnification increase with indication of magnification change direction of ZDR=1, while the drive direction of MDR=−1 to the infinity side in case of magnification decrease with indication of ZDR=−1. Such one way drive always brings the lens group to the focusing curve 38 or 39 of correction focusing position.

In summary, MDR=1 for ZDR=1, while MDR=−1 for ZDR=−1.

Returning to the flow of FIG. 6, there is no round error of the A/D converter and no calculation error by the focusing correction calculation section 21 and others assumed. The drive control section 23 receives the correction amount +Dfp corresponding to the arrow 46 with correction focusing direction, so that the flow goes into an affirmative branch at Step S45 of sign judgement with the positive sign of the correction amount +Dfp. Then the flow goes into an affirmative branch at next Step S49 of about whether the magnification is to be increased with reference to the magnification change direction signal MDR=1 output from the drive control section 23. Then at Step S50, it is judged that the focusing lens group F should be driven in the direction of arrow 46 to approach the focusing curve 38 for focusing, because the magnification change direction of magnification increase is the direction of arrow 42 in FIG. 3. Thus the correction focusing direction is determined as MDR=1, but is not output yet.

Step S45 of sign judgement, Step 49 of magnification increase judgement, Step S50 of MDR=1, Step S46 of magnification decrease judgement as later described, and Step S47 of MDR=−1 constitute a direction judgement operation.

If an incorrect correction amount −Dfp as shown by an arrow 55 is output due to correction error or others instead of a correct correction amount +Dfp, the flow goes into the negative branch at Step S45 of sign judgement, further into the negative branch at Step S46 of magnification decrease judgement, and back to Step S40 of magnification change continuation judgement.

This operation is repeated until a correct direction judgement is made, that is, until a correct correction amount (+Dfp in this case) is output. An operation loop from Step S40 of magnification change continuation judgement, via the negative branch either at Step S46 of magnification decrease judgement or at Step S49 of magnification increase judgement in the above direction judgement operation, back to Step S40 of magnification change continuation judgement is called as a direction check loop. After MDR=1 is determined at Step S50, the drive control section 23 converts the correction amount Dfp at Step S48 into a relative correction amount Drv corresponding to the number of rotations of the focus motor 14 using a relation: Drv=Dfp×Ct, where Ct is a constant determined by a specific arrangement of the focus counter 17 and the focusing drive means 13.

At next Step S51 for judging whether a focus deviation is large enough, the drive control section 23 checks whether the relative correction amount Drv exceeds a predetermined value, for example, whether Drv≧20.

The drive control section 23 monitors whether the focus movement or shift amount becomes greater than a predetermined amount during the magnification change operation. As the shift amount is small as shown by a length between the point 44 and the point 45 in FIG. 3 right after start of drive of the magnification changing lens group Z, the flow goes into the negative branch to return to Step S40 for magnification change continuation judgement. Then the above operation is repeated.

This operation loop is called as a shift amount monitoring loop. The shift amount monitoring loop shares a part of steps with the above direction check loop. The magnification change motor 11 continues rotating to drive the magnification changing lens group Z from the arrow 42 through the point 44 to the arrow 43 in FIG. 3.

When Zp=Zp2, and if Drv=20 is reached then, the correction amount +Dfp must be large enough as shown by a length of arrow 47 within a range of the calculation error in the direction judgement operation. Thus there is no chance to output an incorrect correction amount (for example −Dfp), so that the correction focusing direction MDR=1 is determined as above described. Then in the shift amount monitoring loop, the flow goes into an affirmative branch at Step S51 for focus deviation judgement. Then the drive control section 23 output the relative correction amount Drv and the correction focusing direction MDR=1 as an execution direction MDR.

The magnification change drive is stopped at next Step S52. The stop is effected as follows. The magnification change motor 11 is stopped rotating by a stop signal from the magnification change control section 28. The focusing control section 22 received the relative correction amount Drv and the execution direction signal MDR=1 rotates the focus motor 14 at Step S53 for focusing drive to drive the focusing lens group F to the closest side, or in the direction of arrow 47 in FIG. 3.

At Step S54 for judgement of correction focusing achievement, the focusing control section 22 compares the output Dfc of the focus counter 17 with the relative correction amount Drv at frequent intervals. The flow circulates through the negative branch before they become coincident with each other. Thus the drive of the focusing lens group F is continued until the output Dfc coincides with the relative correction amount Drv, returning to Step S53 for focus drive.

Once the focusing lens group F reaches the focusing curve 38 of 3.0 m after moving in the direction of arrow 47 in FIG. 3, Dfc becomes equal to Drv. the flow goes into the affirmative branch of Step S54, and the focus motor 14 is stopped at Step S55 for focus drive stop. The above operation is a first cycle of magnification change operation and shift correction operation. The flow of FIG. 6 returns to Step S40 for judgement of magnification change continuation, starting a control of second cycle.

The operations from the magnification change drive stop to the focus drive stop after the shift amount monitoring loop is called as a correction focusing operation. The second cycle operation goes into the correction focusing operation after the incorrect correction amount −Dfp is removed by the direction judgement operation, and after the shift amount reaches the predetermined value at Zp=Zp3 by driving the magnification changing lens group 2 in the direction of arrow 56 by the operation of the shift amount monitoring loop.

If the magnification change switch 24 is brought into the neutral state during the correction focusing operation, the correction focusing operation is continued to drive the focusing lens group F in the direction of arrow 48. Then the focusing lens group F reaches the focusing curve 38 at the position of point 49, and the respective section conclude the correction focusing operation to return to Step S40 for judgement of magnification change continuation. At Step S40, the drive control section 23 detects the neutral state of the magnification change switch 24. Then the flow goes into the negative branch of Step S24 for judgement of magnification change continuation and to the next subroutine of Step S41 for correction focusing operation.

The operation of the subroutine is the same as the correction focusing operation as above described. Since the magnification change motor 11 is stopped after the execution of magnification change drive stop in this case, and since Drv=0 right after the correction of shift amount, there is nothing substantially conducted in the subroutine of correction focusing operation.

This subroutine is prepared for a case that the magnification change switch 24 is turned off during the operation of the shift amount monitoring loop. The flow reaches B in FIG. 6, and returns through B to the switch check loop in FIG. 5. Since the magnification change switch 24 is in the neutral state at this stage, the operation of switch check loop is repeated thereafter. The magnification increase operation is completed as above.

The magnification changing lens group Z and the focusing lens group F are now at the point 49 in FIG. 3. The magnification decrease operation is explained in the following from the point 49. Since the magnification decrease operation is analogous to the above-described magnification increase operation, only the point is explained for brevity.

Figure 5:
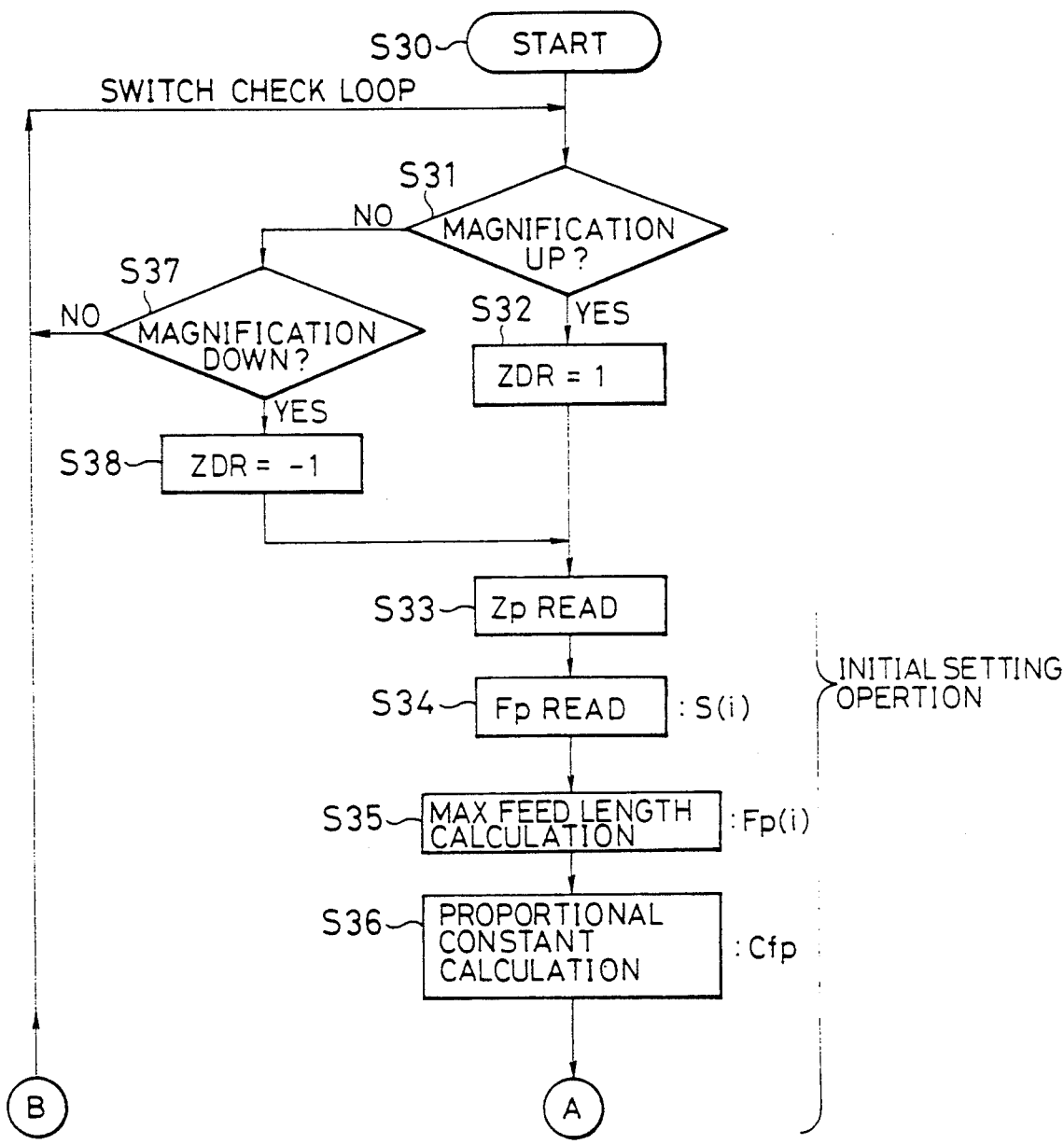
FIG. 5 is a flowchart to show details of the operational steps of the embodiment as shown in FIG. 1.

When the magnification change switch 24 is pressed to the magnification decrease contact 26, the flow goes into the affirmative branch at Step S37 for magnification decrease judgement in the switch check loop in FIG. 5. At next Step S38, a signal of ZDR=−1 is output to indicate the magnification decrease. Then the initial setting operation is executed. The flow proceeds to the magnification change operation in FIG. 6. An incorrect correction amount (+Dfp in this case) is removed in the direction judgement operation. Then the correction focusing direction MDR=−1 is determined.

After that, the shift amount monitoring loop and correction focusing operation are executed. In FIG. 3, the magnification changing lens group Z moves from the point 49 in the direction of arrow 51. Once the shift amount exceeds a predetermined value, the flow goes into the correction focusing operation to drive the focusing lens group F in the direction of arrow 53, finishing the first cycle. A similar focusing is effected in the directions of arrow 52 and of arrow 54. The focusing operation is stopped when the magnification change switch 24 is brought into the neutral state.

Figure 4B:
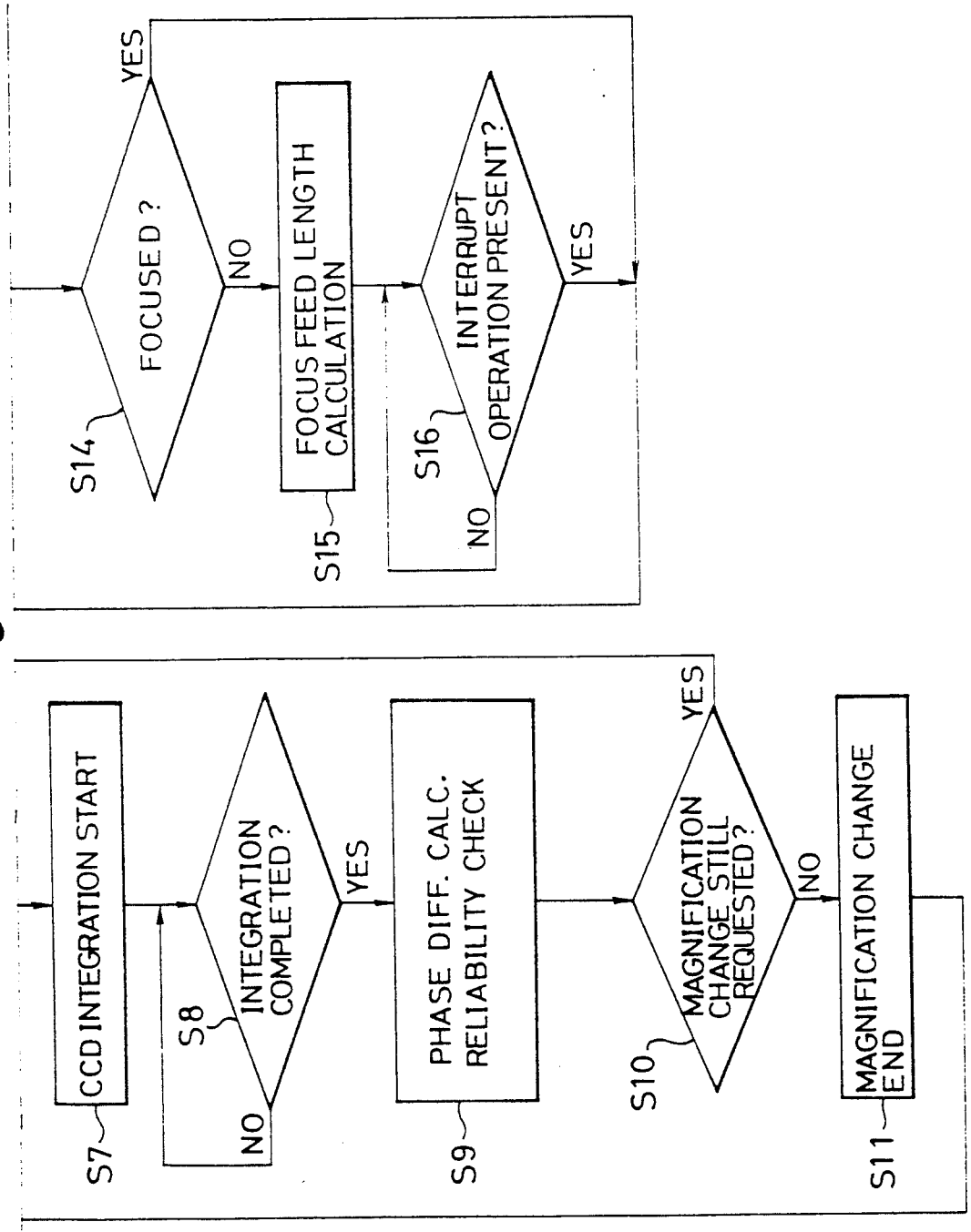
FIG. 4*i*-4*i* flowcharts to show operational steps of the embodiment as shown in FIG. 1.

Returning to the flowchart as shown in FIG. 4, the magnification change operation, the correction focusing operation, and the other operations as shown in the flowcharts of FIGS. 5 and 6 are executed between the magnification change start at Step S6 and the magnification change end at Step S11 as an interrupt operation.

When the magnification change is started at Step S6, a CCD integration is started at next Step S7. A charge is first removed in the CCD (photoreceptor) in the phase difference detection section 9. The CCD starts an integration of light received in dependence on an intensity distribution of optical flux for distance measurement. It is judged at Step S8 whether the integration is completed. The flow goes into an affirmative branch when an output level of each element of the CCD reaches a predetermined value. The flow goes into a negative branch before the output level reaches the predetermined value.

If the flow goes into the affirmative branch at Step S8, a phase difference detection datum AFD of that time is transferred to the judgement and calculation section 29. The phase difference calculation section 30 carries out a calculation of phase difference at next Step S9. Then the judgement and calculation section 29 outputs a focusing drive amount datum AFd to the drive control section 23.

The judgement section 31 of the judgement and calculation section 29 simultaneously judges a reliability of the phase difference detection datum AFD about whether the datum AFD can be used as a final distance measurement datum. The judgement result is transferred as a judgement signal SC to the drive control section 23 to be stored therein. Then the flow goes to next Step S10.

It is judged at Step S10 whether a magnification change is requested. Specifically, when the magnification change switch 24 is in the neutral state, the tele signal TSW and the wide signal WSW both are at the H level. The drive control section 23 judges that condition, and the flow goes into the negative branch. Then the flow proceeds to Step S11 to complete the magnification change drive.

Figure 7:
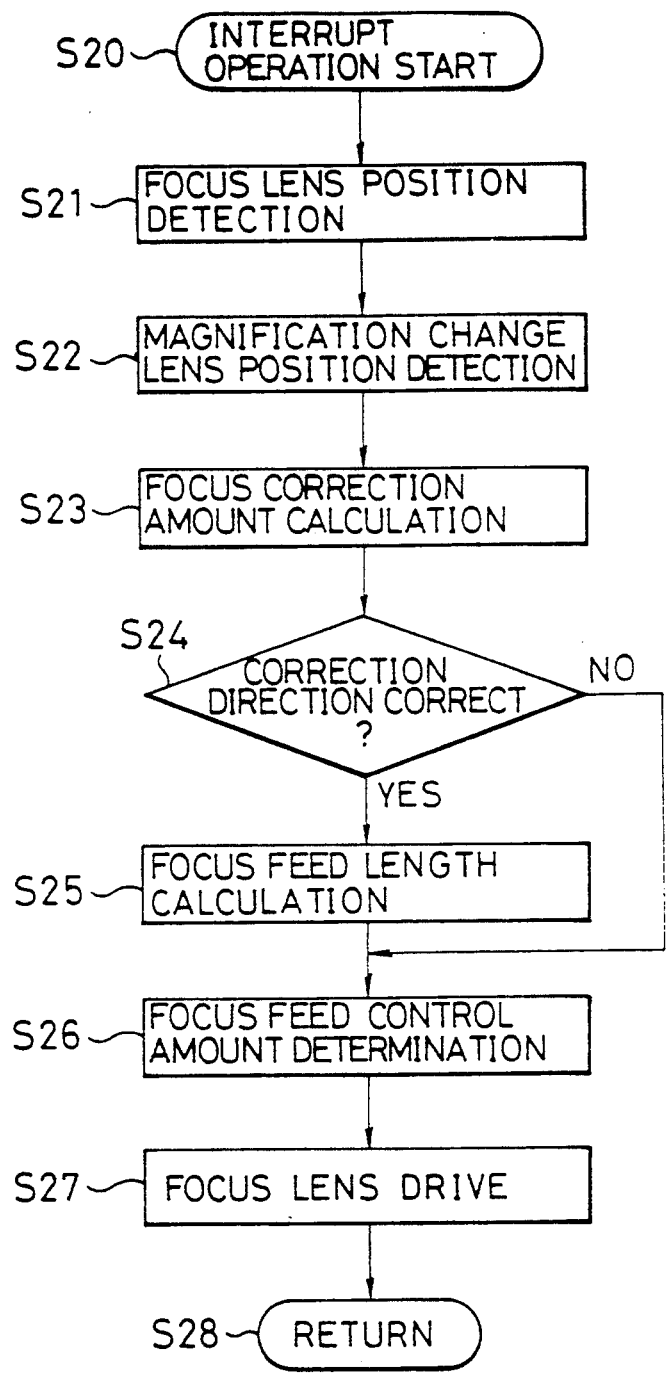
FIG. 7 is a flowchart to show an interruption handling routine in the operations of the embodiment as shown in FIG. 1.

There is an interrupt operation as shown in a flowchart of FIG. 7. The interrupt operation is repeatedly executed between the magnification change start at Step S6 and the magnification change end at Step S11.

Details of the interrupt operation are as follows.

The interrupt operation starts at Step S20, and a focus position is detected at Step S21. This detection is to obtain a focusing lens position datum Fp by the FPM 15. A magnification change position is detected at next Step S22.

This detection is to obtain a focal length datum Zp by the ZPM 12.

A calculation of focusing correction amount is carried out at Step S23 from the focusing position datum Fp and the focal length datum Zp obtained at Steps S21 and S22.

The focusing correction amount is obtained by the following equation:

$$Dfp = Cfp/C4 \times Fpx - Fp,$$

where Dfp is a focusing correction amount, Cfp an initial focusing lens position datum at the start of magnification change, C4 a constant, and Fpx a closest focusing lens position datum at a magnification change position.

It is judged at Step S24 whether the correction direction is correct. As explained above with reference to FIG. 3, the correct correction direction is a drive to the closest side in case of a magnification change to the tele side, or a drive to the infinity side in case of a magnification change to the wide side, with reference to a current magnification change position. An incorrect correction direction is a drive to the infinity side in case of a magnification change to the tele side, or a drive to the closest side in case of a magnification change to the wide side.

If Step S24 is affirmed, a focus feed length is calculated at Step S25. A focus feed control amount is determined at Step S26. A focus lens drive is conducted at Step S27. Then the flow goes to Step S28 to return the series of interrupt operation.

The determination of focus feed control amount at Step S26 is as follows. If the phase difference calculation section 30 of the judgement and calculation section 29 is processing a previous calculation of phase difference datum from the phase difference detection portion, a current calculation datum is added to the previous phase difference datum under calculation. If a previous calculation of phase difference datum is not executed, the focus feed control amount is determined to be a focus feed length obtained from a focusing correction amount at Step S23.

The above Steps S20-S28 are repeated under a control of timer between the magnification change start and the magnification change end, that is, between Step S6 and Step S11, in the flowchart as shown in FIG. 4.

Returning to the flowchart of FIG. 4, if it is judged at Step S10 that a magnification change is requested, the flow goes to Step S12 to judge whether a distance measurement is possible. This judgement is executed by the judgement section 31 of the judgement and calculation section 29. The judgement section 31 judges that a distance measurement is possible, if a reliability of datum obtained by the phase difference calculation section 30 is acceptable. It is judged that a distance measurement is impossible, if the magnification change is effected between the integration start and the integration end of the CCD in the phase difference detection section 9 so as to cause a great error component in a true phase difference datum. It is also judged that a distance measurement is impossible, if a magnification change amount is too great as compared to a time between the integration start and the integration end of the CCD, for example, if a high speed magnification change is requested by an operation of the magnification change speed switch 27, or if a subject has a low brightness.

If the flow goes into a negative branch at Step S12, the flow returns to Step S7 to start another CCD integration for retrial of distance measurement.

If the flow goes into an affirmative branch at Step S12, a focusing drive is executed at Step S13 based on the phase difference calculation at Step S9. It is judged at Step S14 whether an in-focus state is achieved. If affirmed, the flow returns to above Step S3 to carry out a series of focusing drive and magnification change drive.

If the flow goes into the negative branch at Step S14, a calculation of focus feed length is again executed at Step S15. It is judged at Step S16 whether there is an interrupt operation. This interrupt operation is that as explained above with the flowchart of FIG. 7.

In the present embodiment as explained, an imaging offset may be corrected during the magnification change operation as follows. The magnification change direction signal ZDR indicating the direction of magnification change operation is converted into the drive direction of focusing lens group F in accordance with the predetermined relation rising from the characteristics of the magnification changing lens group Z. The correction focusing (shift correction) operation is executed only if a correction amount, which could include an incorrect correction focusing direction and which is output from the focusing correction calculation section 21, has a correction focusing direction coincident with the drive direction. A correction amount including an incorrect correction focusing direction may be removed. Therefore, the focusing lens group F will never oscillate. Then a stable shift correction and magnification change operation may be conducted at a high speed without a waste of power in the focus motor and without unnecessary abrasion of members constituting the focus drive section.

Also, the shift correction is executed only if the relative correction amount Drv exceeds the predetermined value sufficiently larger than a fluctuation component such as a calculation error. This permits a stabler control.

Further, the correction amount Dfp calculated as an absolute value is converted into a relative correction amount comparative to a count number of the focus counter corresponding to a rotation angle (pulse number) of the focus motor to control the position of the focusing lens group F. This arrangement has a higher resolving power to allow a high precision position control, as compared for example to an arrangement using a potentiometer as relative movement amount detection means as used for the FPM 15.

The present invention is not limited to the above-described embodiment, but may be modified within the scope thereof.

In the above embodiment, the judgement section 31 constituting the judgement and calculation section 29 executes a judgement about whether a distance measurement is possible, based on the focusing detection datum (phase difference detection datum AFD) obtained by the focusing detection means (phase difference detection section 9). If the distance measurement is not available, the focusing drive is executed using a previous focusing correction amount. If the focusing detection datum is under detection, the focusing drive may be executed using the previous focusing detection datum. If the focusing detection datum is under calculation, the focusing drive may be executed using the previous focusing detection datum.

The judgement of focus deviation in the flowchart of FIG. 6 is not limited to the condition of Drv≧20. The lower limit may be chosen to optimize a control speed, a stability of control, a looking of finder observation image, and others while increasing and decreasing. The shift correction may be effected for each of constant magnification change amount.

Concrete means for judging a distance measurement at Step S12 in FIG. 4 may be arranged to change a judgement standard depending on agreement or disagreement between a focusing direction of phase difference datum detected and a focusing deviation direction by a magnification change operation. The focusing direction is a direction of focusing drive either to the infinity side or to the closest side. The focusing deviation direction is a direction in which a drive to the tele side makes the system in focus or out of focus, or a direction in which a drive to the wide side makes the system in focus or out of focus.

In the focus feed length calculation at Step S15 in FIG. 4, if a subject is a moving object, a movement of subject may be estimated, which the subject might move in a time delay until completion of focusing drive.

Many widely different embodiments of the present invention may be constructed without departing from the spirit and scope of the present invention. It should be understood that the present invention is not limited to the specific embodiment described in the specification, except as defined in the appended claims.

What is claimed is:

1. A control apparatus for vari-focal lens comprising a magnification changing lens group and a focusing lens group coaxially disposed, comprising:

magnification change drive means for driving said magnification changing lens group;

magnification changing lens position detection means for detecting a position of the magnification changing lens group on an optical axis;

focusing drive means for driving said focusing lens group;

focusing lens position detection means for detecting a position of the focusing lens group on said optical axis;

focusing correction calculation means for calculating a correction amount of position of the focusing lens group to a given magnification change with reference to a predetermined relation between the magnification changing lens group position and the focusing lens group position;

focusing detection means for receiving an optical flux through the vari-focal lens to obtain a focusing detection datum about focusing;

judgement and process means for performing a judgement about said focusing detection datum and for performing a process of said focusing detection datum; and p1 control means for controlling drives of said magnification change drive means and of said focusing drive means by the given magnification change, the correction amount calculated, and the focusing detection datum with reference to the judgement and process of said judgement and process means.

2. A control apparatus for vari-focal lens according to claim 1, wherein said judgement of the judgement and process means is about whether a distance measurement is possible based on the focusing detection datum.

3. A control apparatus for vari-focal lens according to claim 1, wherein said judgement of the judgement and process means is about whether the focusing detection datum is under detection.

4. A control apparatus for vari-focal lens according to claim 1, wherein said judgement of the judgement and process means is about whether the focusing detection datum is under process.

5. A control apparatus for vari-focal lens according to claim 1, wherein said process of the judgement and process means is a process to calculate a focus deviation amount from the focusing detection datum.

6. A control apparatus for vari-focal lens according to claim 1, wherein the correction amount calculated by said focusing correction calculation means is an amount and a direction of correction by which the focusing lens group is to be moved.

7. A control apparatus for vari-focal lens according to claim 1, wherein said predetermined relation for obtaining said correction amount is as follows:

$$Dfp = \{Cfp \times Fp(e)/C4\} - S(i),$$

where Dfp is the correction amount, S(n) a focusing lens position with respect to the infinity at a given focal length point n on the optical axis, Fp(n) a maximum focusing lens position with respect to the infinity on the optical axis for n, $Cfp = \{S(i)/Fp(i)\} \times C4$, i an initial point, C4 a constant, and e an end point.

8. A control apparatus for vari-focal lens according to claim 7, wherein Fp(e) is calculated as follows:

$$Fp(e) = \{C2/Zp + C1)\} + C3,$$

where C1, C2, C3 are constants, which include a parameter of subject distance, and Zp is a datum about a focal length.

9. A control apparatus for vari-focal lens according to claim 2, wherein, where the distance measurement is not possible, the control means controls the focusing drive means to drive the focusing lens group based on the correction amount calculated, while, where the distance measurement is possible, the control means controls the focusing drive means to drive the focusing lens group based on the focusing detection datum.

10. A control apparatus for vari-focal lens according to claim 3, wherein, where the focusing detection datum is under detection, the control means controls the focusing drive means to drive the focusing lens group based on the correction amount calculated, while, where the focusing detection datum has been detected, the control means controls the focusing drive means to drive the focusing lens group based on the focusing detection datum.

11. A control apparatus for vari-focal lens according to claim 4, wherein, where the focusing detection datum is under process, the control means controls the focusing drive means to drive the focusing lens group based on the correction amount calculated, while, where the focusing detection datum has been processed, the control means controls the focusing drive means to drive the focusing lens group based on the focusing detection datum processed.

12. A control apparatus for vari-focal lens according to claim 6, wherein said control means makes the focusing drive means drive the focusing lens group only if said correction amount has the direction of correction correspondent to a predetermined direction.

13. A control apparatus for vari-focal lens according to claim 6, wherein said control means makes the focusing drive means drive the focusing lens group only if said correction amount exceeds a predetermined amount.

14. A control apparatus for vari-focal lens according to claim 6, wherein said drive of the focusing drive means based on said correction amount is monitored by a slit disk and a focus counter.

15. A camera with a vari-focal lens, comprising:
a control apparatus as set forth in claim 1;
a vari-focal lens comprising a magnification changing lens group and a focusing lens group;
image recording means for recording an image obtained through said vari-focal lens; and
magnification change setting means for setting a magnification change amount.

16. A control method for vari-focal lens comprising a magnification changing lens group and a focusing lens group coaxially disposed, comprising:
a magnification changing lens position detection step for detecting a position of the magnification changing lens group on an optical axis;
a focusing lens position detection step for detecting a position of the focusing lens group on said optical axis;

a focusing correction calculation step for calculating a correction amount of position of the focusing lens group to a given magnification change with reference to a predetermined relation between the magnification changing lens group position and the focusing lens group position;

a focusing detection step for receiving an optical flux through the vari-focal lens to obtain a focusing detection datum about focusing;

a judgement and process step for performing a judgement about said focusing detection datum and for performing a process of said focusing detection datum; and a control step for controlling drives of said magnification changing lens group and of said focusing lens group by the given magnification change, the correction amount calculated, and the focusing detection datum with reference to the judgement and process in said judgement and process step.

17. A control apparatus for vari-focal lens having a variable magnification photographic optical system comprising a magnification changing lens group and a focusing lens group disposed on a single optical axis, said vari-focal lens causing an imaging position offset with a single subject by a magnification change drive of the magnification changing lens group, comprising:

magnification change drive means for driving said magnification changing lens group;

magnification changing lens position detection means for detecting a position of said magnification changing lens group on the optical axis to obtain a magnification changing lens position datum;

focusing drive means for driving said focusing lens group;

focusing lens position detection means for detecting a position of said focusing lens group on the optical axis to obtain a focusing lens position datum;

focusing correction calculation means for receiving the position data from said magnification changing lens position detection means and from said focusing lens position detection means to conduct a focus correction calculation before and during magnification changes of the magnification changing lens group to obtain a movement amount and a drive direction of the focusing lens group to a correction focusing position where the imaging position offset may be corrected. as a correction amount datum and as a correction focusing direction datum, respectively;

focusing detection means for receiving an optical flux through the variable magnification photographic optical system to obtain a focusing detection datum;

judgement and calculation means for performing a judgement about whether a distance measurement is possible for carrying out a calculation of a focusing deviation amount datum, based on the focusing detection datum obtained by said focusing detection means; and control means for controlling said focusing drive means such that, where said judgement and calculation means judges that the distance measurement is possible, said focusing lens group is driven based on the focusing detection datum obtained by said focusing detection means at the time of judgement, and the correction amount datum and the correction focusing direction datum, which have been obtained by said focusing correction calculation means based on the magnification changing lens position datum obtained by said magnification changing lens position detection means and on the focusing lens position datum obtained by said focusing lens position detection means, are stored for a preparation for a next drive of the focusing lens group, while such that, where said judgement and calculation means judges that the distance measurement is not possible, said focusing lens group is driven based on the correction amount datum and the correction focusing direction datum which have already been obtained by said focusing correction calculation means.

18. A control apparatus for vari-focal lens having a variable magnification photographic optical system comprising a magnification changing lens group and a focusing lens group disposed on a single optical axis, said vari-focal lens causing an imaging position offset with a single subject by a magnification change drive of the magnification changing lens group, comprising:

magnification change drive means for driving said magnification changing lens group;

magnification changing lens position detection means for detecting a position of said magnification changing lens group on the optical axis to obtain a magnification changing lens position datum;

focusing drive means for driving said focusing lens group;

focusing lens position detection means for detecting a position of said focusing lens group on the optical axis to obtain a focusing lens position datum;

focusing correction calculation means for receiving the position data from said magnification changing lens position detection means and from said focusing lens position detection means to conduct a focus correction calculation before and during magnification change of the magnification changing lens group to obtain a movement amount and a drive direction of the focusing lens group to correction focusing position where the imaging position offset may be corrected, as a correction amount datum and as a correction focusing direction datum, respectively;

focusing detection means for receiving an optical flux through the variable magnification photographic optical system to obtain a focusing detection datum;

judgement and calculation means for performing a judgement about whether a focusing detection datum is under detection by the focusing detection means and for carrying out a calculation of a focusing deviation amount datum based on the focusing detection datum obtained by said focusing detection means; and control means for controlling said focusing drive means such that, where said judgement and calculation means judges that the focusing detection datum is under detection, said focusing lens group is driven based on the focusing detection datum obtained by said focusing detection means at the time of judgement, and the correction amount datum and the correction focusing direction datum, which have been obtained by said focusing correction calculation means based on the magnification changing lens position datum obtained by said magnification changing lens position detection means and on the focusing lens position datum obtained by said focusing lens position detection means, are stored for preparation for a next drive of the focusing lens group, while such that, where said judgement and calculation means judges that the focusing detection datum is under detection, said focusing lens group is driven based on the correction amount datum and the correction focusing direction datum which have already been obtained by said focusing correction calculation means.

19. A control apparatus for vari-focal lens having a variable magnification photographic optical system comprising a magnification changing lens group and a focusing lens group disposed on a single optical axis, said vari-focal lens causing an imaging position offset with a single subject by a magnification change drive of the magnification changing lens group, comprising:

magnification change drive means for driving said magnification changing lens group;

magnification changing lens position detection means for detecting a position of said magnification changing lens group on the optical axis to obtain a magnification changing lens position datum;

focusing drive means for driving said focusing lens group;

focusing lens position detection means for detecting a position of said focusing lens group on the optical axis to obtain a focusing lens position datum;

focusing correction calculation means for receiving the position data from said magnification changing lens position detection means and from said focusing lens position detection means to conduct a focus correction calculation before and during magnification change of the magnification changing lens group to obtain a movement amount and a drive direction of the focusing lens group to a correction focusing position where the imaging position offset may be corrected, as a correction amount datum and as a correction focusing direction datum, respectively;

focusing detection means for receiving an optical flux through the variable magnification photographic optical system to obtain a focusing detection datum;

judgement and calculation means for performing a judgement about whether a focusing deviation amount datum is under calculation and for carrying out a calculation of a focusing deviation amount datum based on the focusing detection datum obtained by said focusing detection means; and control means for controlling said focusing drive means such that, where said judgement and calculation means judges that the focusing deviation amount datum has been calculated, said focusing lens group is driven based on the focusing detection datum obtained by said focusing detection means at the time of judgement, and the correction amount datum and the correction focusing direction datum, which have been obtained by said focusing correction calculation means based on the magnification changing lens position datum obtained by said magnification changing lens position detection means and on the focusing lens position datum obtained by said focusing lens position detection means, are stored for preparation for a next drive of the focusing lens group, while such that, where said judgement and calculation means judges that the focusing deviation amount datum is under calculation, said focusing lens group is driven based on the correction amount datum and the correction focusing direction datum which have already been obtained by said focusing correction calculation means.

* * * * *

UNITED STATES PATENT AND TRADEMARK OFFICE
CERTIFICATE OF CORRECTION

PATENT NO. : 5,274,223
DATED : December 28, 1993
INVENTOR(S) : HATA

It is certified that error appears in the above-indentified patent and that said Letters Patent is hereby corrected as shown below:

Column 21, line 30, delete in its entirety and insert
--datum; and
        control means for controlling drives--

Signed and Sealed this

Second Day of August, 1994

*Attest:*

BRUCE LEHMAN

*Attesting Officer*    *Commissioner of Patents and Trademarks*